Sept. 19, 1944.   W. M. EWART ET AL   2,358,389
INDEXING TYPE MULTIPLE STATION DRILLING MACHINE
Filed Aug. 4, 1940   4 Sheets-Sheet 1

INVENTORS
WILLIAM M. EWART
JOHN H. KLASEY
ATTORNEY

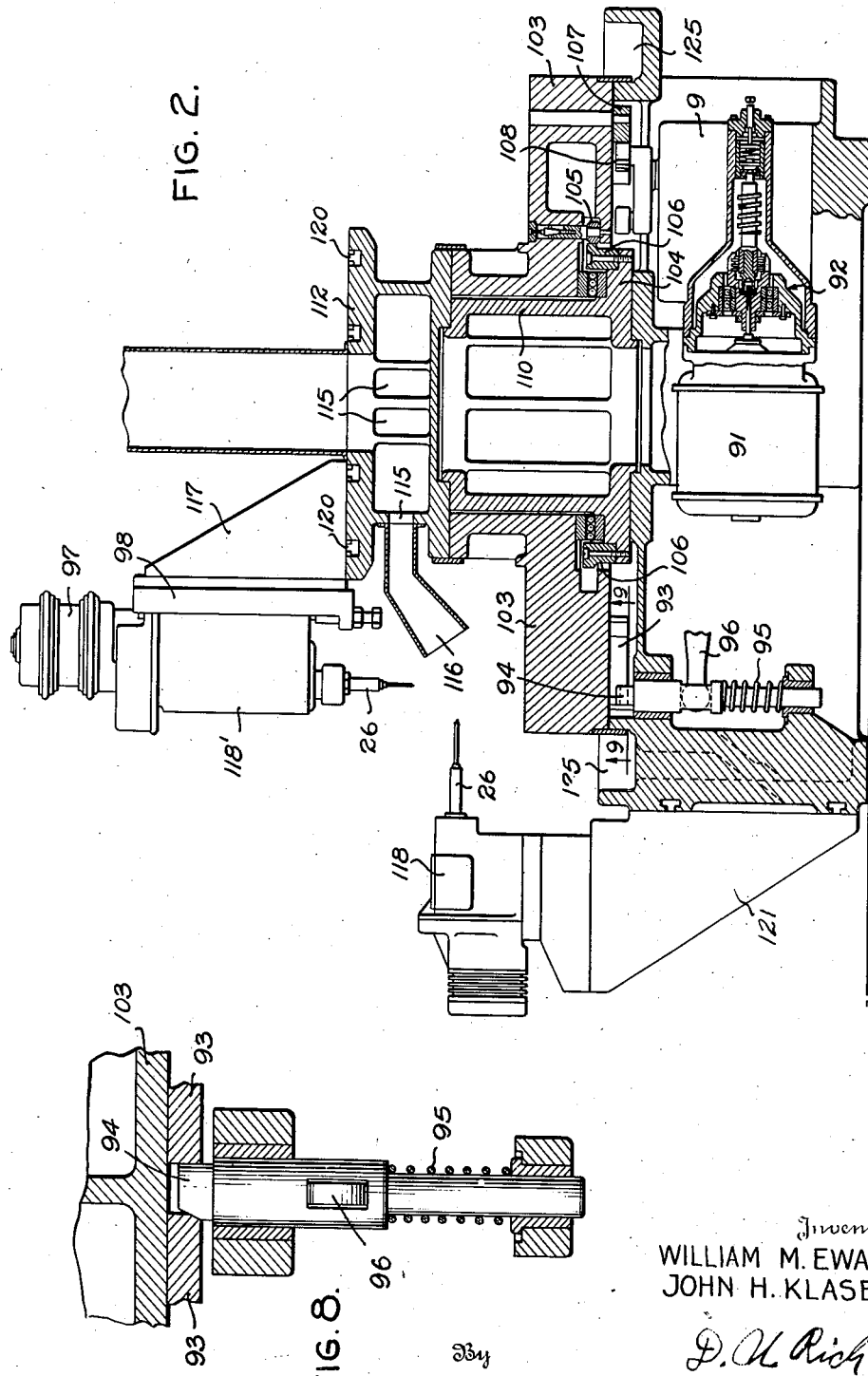

Sept. 19, 1944.   W. M. EWART ET AL   2,358,389
INDEXING TYPE MULTIPLE STATION DRILLING MACHINE
Filed Aug. 4, 1940   4 Sheets-Sheet 4

Inventors
WILLIAM M. EWART
JOHN H. KLASEY.

By   P. A. Rich
Attorney

Patented Sept. 19, 1944

2,358,389

UNITED STATES PATENT OFFICE 2,358,389

INDEXING TYPE MULTIPLE STATION DRILLING MACHINE

William M. Ewart, Webster Groves, and John H. Klasey, St. Louis, Mo., assignors to Carter Carburetor Corporation, St. Louis, Mo., a corporation of Delaware Application August 4, 1940, Serial No. 351,362

11 Claims. (Cl. 77—64)

This invention relates to means and methods for drilling and machining castings and other body members requiring large numbers of holes or other machining operations particularly where such holes are of different depths and sizes and required to be drilled or machined at different angles. A particular use to which the machine is well adapted is the machining of carburetor body castings, although the inventions disclosed herein are capable of being used for other purposes.

One of the chief difficulties previously met has been that of producing a machine capable of drilling a sufficiently large number of holes in the same casting without involving such large castings and dimensions of the machine generally as to make it impossible to maintain sufficient accuracy. As is well known large machines of this general character are most conveniently made from grey iron castings which are susceptible to substantial strains and resulting changes in dimensions after the machining operation has been performed. Other difficulties with large castings of this general character are also well understood by those in the art.

It is one object of my invention to produce a machine of comparatively small size which is capable of drilling a very large number of holes with extreme accuracy and which is capable of being adjusted to different castings and operations without change in the main structure of the machine.

Another difficulty which has been met with in previous practice has been due to the fact that the speed of the machine was the speed of the slowest operation, for instance, if there were ten holes to be drilled, each of which required three seconds and the other of which required twelve seconds, then the whole operation would have to wait until the completion of the hole requiring twelve seconds. One object of my invention is to provide a method by which the speed of the operation can be increased to substantially the speed permitted by the shorter operation increasing the number of stages or stations so as to permit the longer operations to be covered in two or more stages. Where the operation is slowed up on account of the larger diameter or greater depth of a hole which is to be drilled, this feature has proved to be of great importance in increasing the rate of production.

Another difficulty that has been met in previous constructions has been the inaccessibility of the traveling work table and the great amount of floor space required by the machine. One object of my invention is to substantially increase the accessibility to the operator for loading and unloading the work holders and also to reduce the amount of floor space required.

A further disadvantage found in previous constructions has been the difficulty of eliminating chips and dust, the chips being thrown into a position where they could not be conveniently recovered except by the operator who had to stop the normal loading and unloading of the machine for that purpose. Accordingly, a further object of my invention is to produce a machine which eliminates accumulations of chips and withdraws the dust so that the operator can work in a clean atmosphere and is not required to be interrupted. Another difficulty that has been met with the previous construction has been inability to drill the castings from all angles, particularly angles of approach below the horizontal. One object of my invention is to eliminate this difficulty. This object includes the provision of means whereby the drills can be made to approach the body member from the front, sides, rear and top as well as angles below the horizontal.

These and other objects and advantages will become apparent from the following description when taken in conjunction with the drawings, in which:

Fig. 2 is a front elevation of a slightly modified machine showing some parts broken away and others in section.

Fig. 8 is a detail view of the abutment.

Figure 1:
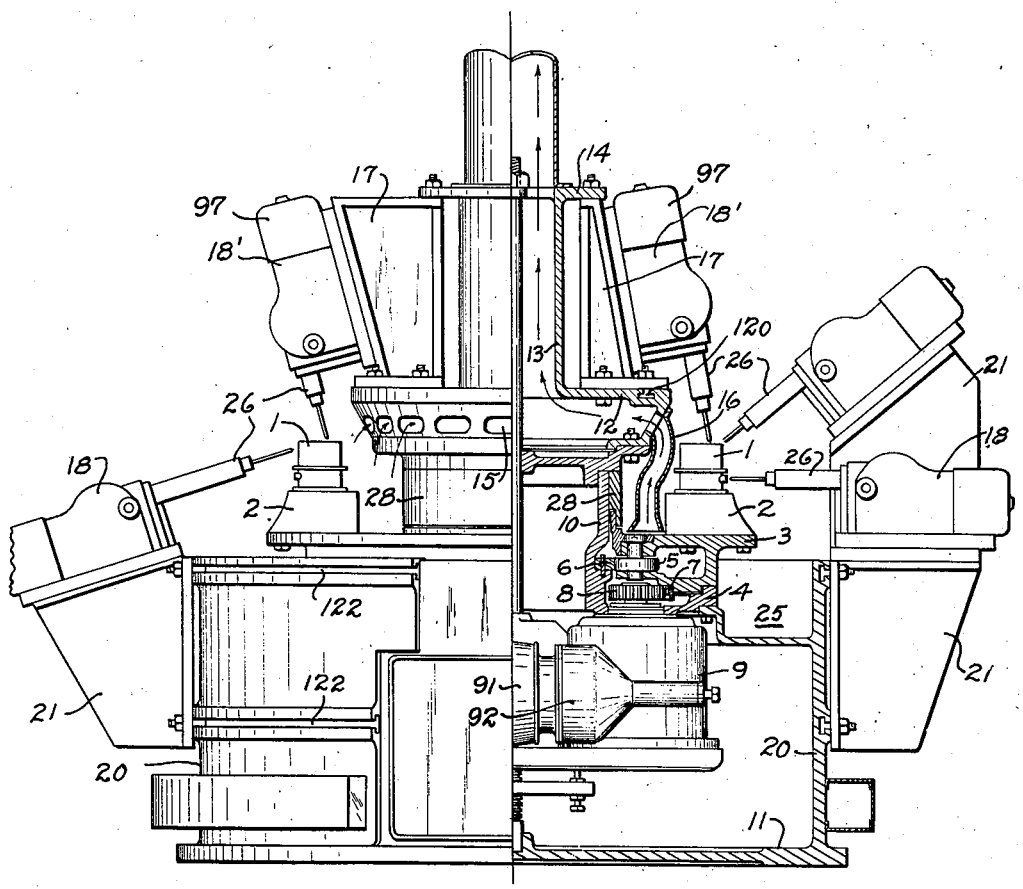
Fig. 1 is a front elevation of the multi-station indexing type drilling machine with one half in section.

Referring to the drawings, (Fig. 1) the work units 1 such as carburetor body castings are chucked on suitable fixtures 2 which are equally spaced on the revolving work table 3. Revolving table or carriage 3 is preferably constructed in the form of a solid ring slidably supported on the riser support 4 and concentrically centered by the rollers 5 secured to the table 3 and bearing against the ring 6 which is rigidly secured to the riser support. For driving the table, a split ring gear 7 is mounted on the underside of the table and driven by the pinion 8 operated by the indexing unit, indicated at 9.

Riser 10 supported on base member 11 extends upwardly through the table 3 and supports a member comprising a horizontal bed 12 and a vertical conduit 13 flanged at 14, to which an exhaust duct is connected. Bed 12 is of hollow construction and provided with a plurality of openings 15 for removing dust incident to the operations performed on work 1.

With continued operation of the machine, dust will collect between the fixtures 2 and the riser 10, and to remove this, one of the openings 15 is provided with an extension conduit 16 extending in close proximity to the top of the table 3 for collecting the dust and conducting it upwardly through the bed 12 and conduit 13 and the exhaust duct.

Hollow venting structure 12, 13 is provided with annular T slots, one being shown at 120, for anchoring the lower parts of unit knees 17 at any desired position, the upper portions of knees 17 being secured to the underside of flange 14 projecting from conduits 13. With this arrangement of mounting knees 17, the greatest flexibility is achieved in mounting the operating units 18' at various angles from the perpendicular.

Base 11 is constructed with cylindrical side walls 20 which are provided with spaced T slots 122 for securing the knees or operating unit supports 21 at any desired position about its periphery.

By mounting the operating units 18 on knees 21 which are in turn mounted on the side wall 20 of base 11, the base casting 11 may be made much smaller than is required when the supports for the operating units are cast integral with the base. With the use of various shaped knees anchored in this manner to the walls 20, it is possible to act upon the work 1 at angles above and below the horizontal. A trough 25 receives drillings from the machine, which may be swept out through a suitable cleanout opening in the rear of the machine. The units 18 and 18' illustrated are automatically operated from a master control (not shown) and the drill spindles 26 extend to perform their operation, and when finished, retract to the positions shown to clear the work as the table 3 is rotated.

To remove a section of split ring gear 7, it is only necessary to remove the sectional plates 28 encasing the riser 10 and raise table 3 sufficiently to facilitate the passing of the ring gear section 7 outwardly between the table 3 and the riser support 4. By this construction, it is not necessary to dismantle the machine entirely to replace the ring gear; thus, the time required to effect the replacement is only a fraction of the time generally required.

Mechanism for operating the table is shown in Fig. 2 in which identical parts are given the same reference numerals as in Fig. 1. The table is driven by the motor 91 through the friction clutch mechanism 92 and suitable reduction gearing. Indexing is effected by a series of equally spaced stop blocks 93 which are mounted on the under surface of the table and positioned to engage a latching abutment 94 so that the table is held in fixed position until the abutment is withdrawn prior to the next indexing movement. At each stop all the drills, taps, or other machining devices advance simultaneously to perform their operation on the work and the smaller operations are completed at one station. The deeper and larger holes, however, require more time and after the completion of the shorter operations at one station the tools, drills, etc., are withdrawn from the deeper holes as well as the smaller. The indexing unit then rotates table 3 another portion of a revolution or station and then locks it in its new position, and the operations of the units are repeated. At the next station each drill will reperform its original operation on another piece or casting but some of the stations will, at each operation, merely deepen, enlarge or complete an operation initiated at a previous station. All desired operations will have been performed when the table 3 has made one complete revolution.

Stop blocks 93 are secured in radial slots between depending ribs 99 on the undersurface of the work table. The blocks have non-radial edges for engagement by latching abutment 94 so that radial movement of these blocks varies the locked position of the table. The blocks have slots 100 receiving securing bolts 101.

With the use of the above improvements, the scope of this type of machine is broadened and efficiency is increased and its maintenance cost is reduced.

Figure 7:
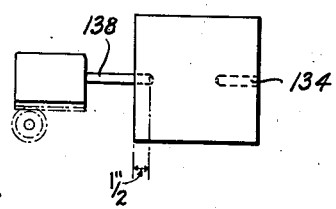

In Figs. 4 to 7, inclusive, the drills 130, 131, and 132 each operate on the same hole 134, shown in Fig. 7. At the station indicated by Fig. 4 the hole is drilled perhaps only one half an inch deep by the drill 130, at another subsequent station the drill 131 takes it for another one half inch and in Fig. 6 the drill 132 takes it for another one half inch, which may be sufficient to complete the hole. Other drills 135, 136, 137 and 138 may operate on the casting to drill different holes at the same or different stations but it will be understood that when the casting has made one complete rotation of the table all operations which are to be completed are performed and the operator removes the finished casting and inserts one which is to be operated on. It will be further noted that the timing at each station is the same. This timing for carburetor bodies is normally from three to five seconds, whereas a single operator might take twenty or thirty seconds to drill a single hole.

While the present organization shown and described perhaps involves certain features heretofore known in the art, nevertheless the new combination and arrangement provided produces new and useful results heretofore unknown, these results are to be found in the flexibility of operation, the convenient arrangement of parts and the new provision for accurate manipulation of the drill elements and the work table. The accuracy obtained by the foregoing is extremely desirable, and the speed of operation is in excess of that heretofore known in the art.

Figure 9:
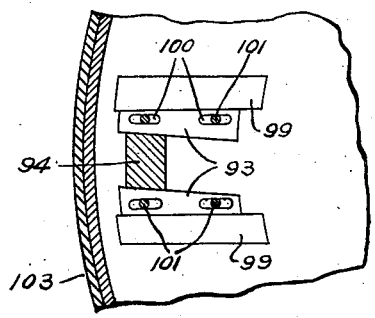
Fig. 9 is a detail horizontal section taken on line 9—9 of Fig. 2.
Figure 3:
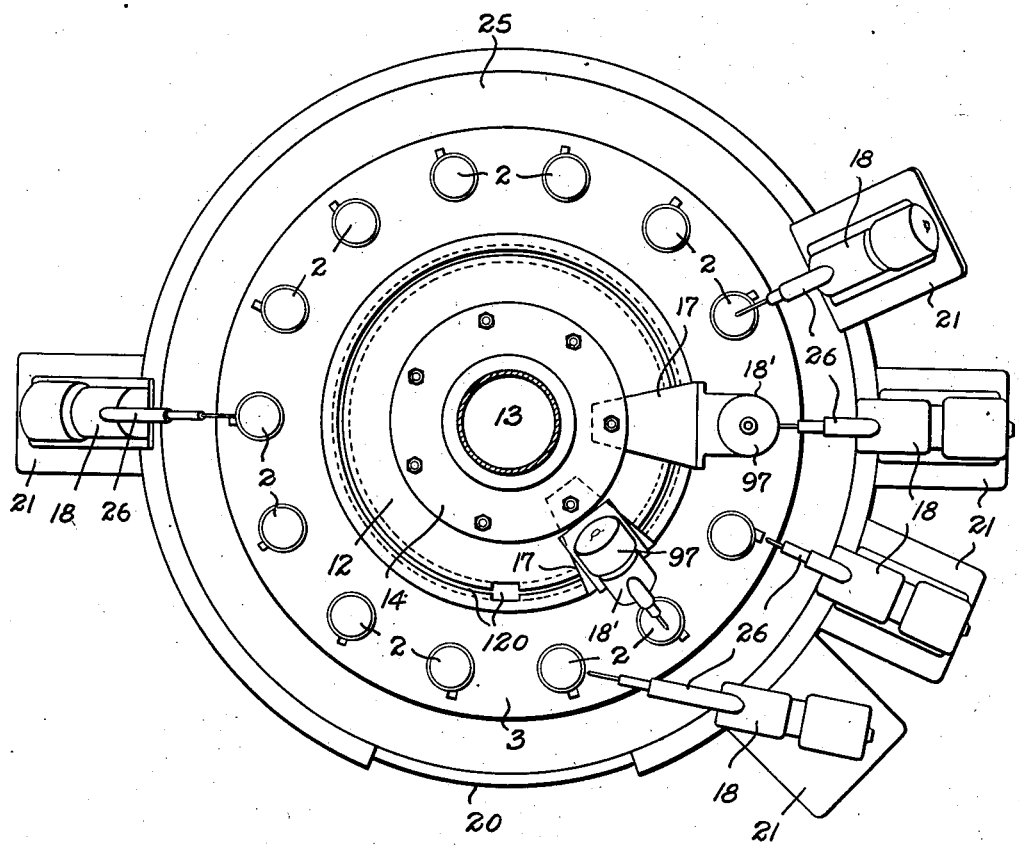
Fig. 3 is a diagrammatic plan view of the work table of the machine in Fig. 1.
Figure 4:
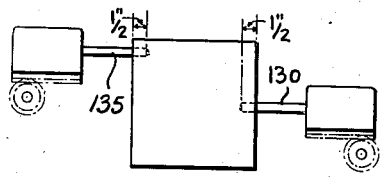
Figs. 4, 5, 6 and 7 are diagrammatic views showing operations at different stations where one of the holes is operated on at three different stations.
Figure 5:
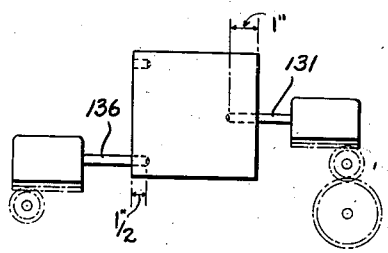
Figure 6:
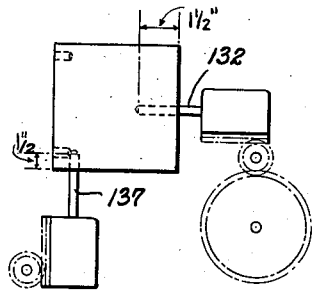

With respect to the device shown in Figures 2, 8, and 9 it will be noted that the drills 118 and 118' are mounted in different angular positions by means of the knees 117 and 121. By this arrangement the drilling machines may remain identical, and the cylindrical outer surfaces of the main base of the machine requires no change, for the adaption of the machine to the drilling of holes at different angles of approach. Thus the machine is completely universal and may be adapted to different classes of work merely by changing the shape, size and angular surfaces of the knees. The drilling machines shown are of the single spindle type, but where parallel holes are to be drilled in the same casting, a multiple spindle head is mounted on the drill spindle. In Figure 2, the indexing is performed by means of a Geneva gear mechanism 108, and the table is held against the stops by means of the friction clutch mechanism 92, and in addition to the clutch mechanism, or in place of it, the motor may be caused to stall, either in reverse against a backward stop, or forwardly against the forward stop 93, the object being to hold the table firmly in place while the drilling operation is being performed. In Fig. 2, dust collecting openings 115 and extension 116 are of modified form.

The method of operation is generally the same in both forms of the device, except where specifically described otherwise, or where obvious from the drawings.

Certain structures involved in the operation of the device may be varied, as for instance the selection of the type of gear used in the driving of certain of the elements. Other changes in details will be apparent to those skilled in the art without departing from the spirit of the invention, and the exclusive use of such changes and modifications as fall within the scope of the appended claims is contemplated.

We claim:

1. In a machine of the class described including a base member having upstanding side walls, a ring type revolving multistation work table supported on said member, a riser protruding through and concentric with said table, a hollow member supported on said riser and constructed and arranged to be connected to a source of suction for collecting foreign particles incident to the operation of the machine, and a drilling unit secured to and at least partially supported by said hollow member.

2. In a machine of the class described including a base member having upstanding side walls, a ring type revolving multistation work table supported on said member, a riser protruding through and concentric with said table, and a hollow member supported on said riser and constructed and arranged to be connected to a source of suction for collecting foreign particles incident to the operation of the machine, said hollow member comprising a bed and a flange constructed and arranged for securing operating unit supports therebetween.

3. In a machine of the class described including a base member having a riser, a ring type revolving multistation work table surrounding said riser and supported by said base, a member supported on said riser and constructed and arranged to support operating units, a driving gear supported from said base, and a driven split ring gear on said table, said table being constructed and arranged to be raised to permit removal of a section of said ring gear between said table and said base.

4. In a machine of the class described including a base member having upstanding sidewalls constructed and arranged to support operating units along the outside of said walls, a ring type revolving multistation work table supported from said base, a riser supported from said base, protruding through and concentric with said table, and an air conducting member supported on said riser for conducting foreign particles from said table, said conducting member having vertically spaced elements for attachment and support of a machining unit.

5. In a machine of the class described including a base member having upstanding sidewalls constructed and arranged to support operating units along the outside of said walls, a ring type revolving multistation work table supported from said base, and a riser structure supported on said base and protruding through said table, a portion of said structure being hollow for conducting foreign particles from said table by air pressure, said structure having bolting surfaces for supporting operating units above said work table.

6. A machine of the class described including a base member, a riser supported on said base member, a ring type revolving work table surrounding said riser and supported on said base member, and a driven split ring gear on said table, said table being constructed and arranged to be raised to accommodate the removal of a section of said ring gear outwardly between said table and said base member.

7. In a machine of the class described including a base member, a revolving multistation work table supported on said base member, a driven split ring gear secured to said table, a riser extending through said table, and an operating unit supported on said riser and overhanging said table, said table being constructed and arranged to be raised for removal of said ring gear without removing said operating unit support.

8. In a drilling machine, a base member having a vertical substantially cylindrical outer surface, a track means formed in a horizontal plane on said surface, a plurality of drill supports carried by said track means and adjustable to different angular positions thereon, a drilling machine carried by each of said drill supports, a rotatable work table concentric with said cylindrical surface, a plurality of work holding devices carried by said work table, said work holding devices being spaced at equal intervals whereby said drilling machines may simultaneously operate on work carried by said work holding devices, a plurality of table stops equally spaced with respect to said work table, a displaceable stop for engaging said stop devices, said stop being constructed and arranged to stop said work holders adjacent each of said drilling machine consecutively, drive means for said work table, said drive means including a continuously operating motor and a friction clutch, and means to operate said drilling machines and bring them into engagement with the work while the table is held in selected position adjacent said machine by the cooperation of said stop devices, the table drive means and the friction clutches.

9. In an indexing machine tool, a circular carriage adapted to be stopped at a plurality of accurately spaced positions, said carriage having a plurality of radial, spaced slots therein, stop blocks secured in said slots and constructed and arranged to be radially adjusted along said slots, said stop blocks having rectilinear stop surfaces slightly out of parallelism with the respective slots, radially fixed stop means adapted to coact with said stop surfaces to stop the movement of said carriage at predetermined points, the angular position of said points being individually adjustable by adjustment of said stop blocks along said slots.

10. In a device of the class described, a work support carriage having a surface of rotation, a slot in said surface extending toward the center thereof, a stop secured in said slot and having a stop surface slightly out of parallelism with said slot, and relatively fixed abutment means for coacting with said stop surface, said carriage being rotatable to a definite fixed position against said abutment means, said fixed position being angularly adjustable by the adjustment of said stop along said slot.

11. A machine of the class described including a base member, a revolving multistation work table supported on said base member, riser structure extending through said table and hollowed for conducting a stream of air, and a tubular element extending from said structure to the vicinity of a work station for directing foreign particles into said structure.

WILLIAM M. EWART.
JOHN H. KLASEY.